US008306887B1

(12) United States Patent
Bucholtz et al.

(10) Patent No.: US 8,306,887 B1
(45) Date of Patent: Nov. 6, 2012

(54) PROJECT ENGINEERING WORKFLOW AND TRACKING INTEGRATION

(75) Inventors: Gregory H. Bucholtz, Overland Park, KS (US); Royal Dean Howell, Trimble, MO (US); Mir Islam, Leawood, KS (US); Robert Eugene McGuire, Lenexa, KS (US); Steven Charles Russell, Lansing, KS (US); Christopher Schultz, Leawood, KS (US); Bhanumathi Tenneti, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 381 days.

(21) Appl. No.: 12/683,055

(22) Filed: Jan. 6, 2010

(51) Int. Cl.

| | |
|---|---|
| ***G06Q 40/00*** | (2012.01) |
| ***G06Q 10/00*** | (2012.01) |
| ***H04W 72/00*** | (2009.01) |

(52) U.S. Cl. .......................... 705/35; 705/300; 455/453

(58) Field of Classification Search .................. 705/1.1, 705/300-301, 348, 35, 35 R; 455/425, 453
See application file for complete search history.

(56) References Cited

U.S. PATENT DOCUMENTS

| | | | | |
|---|---|---|---|---|
| 7,080,031 | B2 * | 7/2006 | Crowe et al. | 705/35 |
| 2002/0042751 | A1 * | 4/2002 | Sarno | 705/26 |
| 2005/0131791 | A1 * | 6/2005 | MacMillan et al. | 705/35 |

* cited by examiner

*Primary Examiner* — Candice D Carter

(57) ABSTRACT

A system is provided comprising a computer, project forecast, workflow allocations, and incurred expense databases, and an application on the computer extracting from the project forecast database a list of costs and revenues associated with a first and second project, costs comprising approved expenses described in the workflow allocations database and incurred expenses in the incurred expense database. The system determines the first project is operational and for a first subscriber base and the second project is incomplete and is to be for a second subscriber base, completion of the second project pending release of a remaining cost item. The system analyzes an alternate allocation of the cost item to improve the profitability of the first subscriber base, delaying the second project. The system determines the proposed alternate allocation increases the first subscriber base profitability more than a reduction of second subscriber base profitability resulting from the proposed alternate allocation.

5 Claims, 6 Drawing Sheets

300

(A)

312 — The computer determines a second revenue impact of the elimination of the cost item, the second revenue impact comprising the loss of subscriber revenue from the second subscriber base arising from the first subscriber base placing additional load on the service infrastructure previously used primarily by the second subscriber base.

314 — The computer determines a first cost impact of the elimination of the cost item, the first cost impact comprising the write-off of the previously incurred development expense for the capital asset.

316 — The computer determines a second cost impact of the elimination of the cost item, the second cost impact arising from the projected increased burden on a customer service function arising from the elimination of the capital asset.

318 — The computer determines a third cost impact of the elimination of the cost item, the third cost impact associated with projected reduction in customer satisfaction arising from the elimination of the capital asset.

320 — The computer determines a fourth cost impact of the elimination of the cost item, the fourth cost impact associated with the release of budgeted but unspent resources remaining in the approved development expense database for the capital asset.

322 — The computer combines the first revenue impact, the second revenue impact, the first cost impact, the second cost impact, the third cost impact, and the fourth cost impact to determine the total financial impact of the manipulation of the cost item comprising elimination of the cost item.

324 — The computer sends a second message to the client device, the second message communicating the total financial impact of the manipulation of the cost item.

End

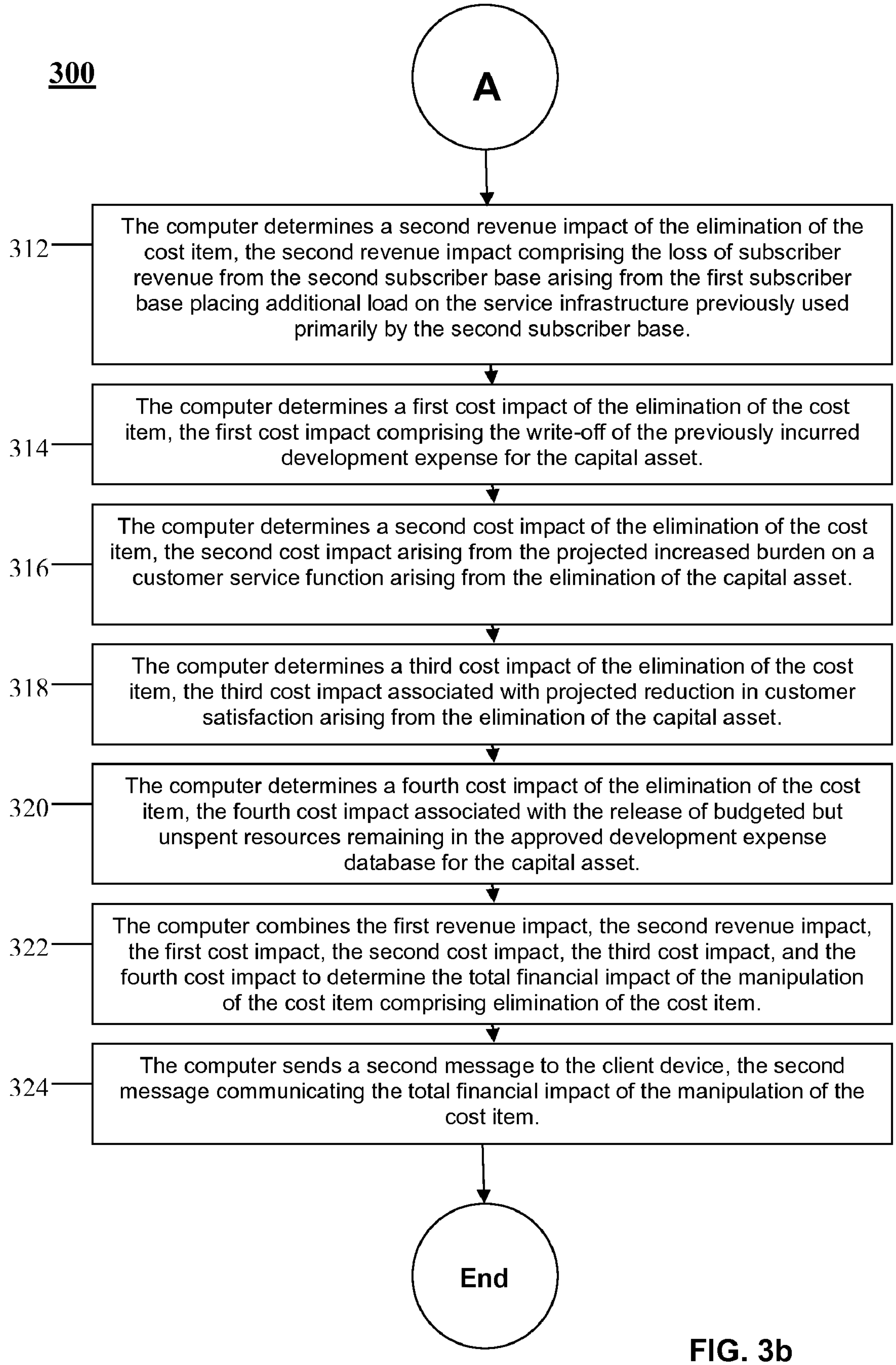

FIG. 3b

PROJECT ENGINEERING WORKFLOW AND TRACKING INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Workflow software automates the capturing of business processes at various levels of an organization. In capital investment project implementations, workflow software may document and facilitate the tracking of approvals for development activities and procurement of materials and services. Decision processes and tracking of document flow associated with the development and implementation of capital projects may also be facilitated by workflow software. Workflow software may be used in analysis of capital budgeting activities wherein techniques are employed to determine economic justification for a firm's long term investments in capital assets, such as new machinery, replacement machinery, new plants, transportation equipment, and telephone exchange switching equipment. Workflow software may also assist in tracking the planning and engineering activities of capital asset deployment and may integrate this information with project lifecycle information, cost and revenue forecasts associated with projects, and work status tracking associated with deployment. Workflow software may also include technical records of development and implementation activities performed in association with capital projects with links to documentation describing, justifying, and supporting the work.

SUMMARY

In an embodiment, a project engineering workflow and tracking system is provided. The system comprises a computer system, a project forecast database, a workflow allocations database, an incurred expense database, and an application, that, when executed on the computer system, extracts from the project forecast database a list of cost and revenue items associated with a first project and a second project in response to a first request contained in a first message received from a client device, wherein the cost items comprise approved but not incurred development expense items further described in the workflow allocations database and wherein the cost items also comprise incurred development expense items further described in the incurred expense database. The system also determines that the first project is operational and is used by a first subscriber base and determines that the second project is incomplete and is scheduled to be used by a second subscriber base wherein completion of the second project is pending solely the release and expenditure of an approved remaining cost item from the workflow allocations database. The system also determines that the profitability associated with the first subscriber base and the profitability projected to be associated with the second subscriber base are equivalent. The system also receives a second message from the client device containing a second request to analyze a proposed alternate allocation of the funds designated for the approved remaining cost item, the proposed alternate allocation to be devoted to the improvement of the profitability associated with the first subscriber base, the proposed alternate allocation delaying the completion of the second project. The system also determines that the proposed alternate allocation increases the profitability of the first subscriber base by a margin greater than a projected reduction of profitability of the second subscriber base arising from the delay of the completion of the second project. The system also sends a third message to the client device, the third message communicating the result of the analysis of the proposed alternate allocation.

In an embodiment, a processor-implemented method of project engineering workflow and tracking is provided. The method comprises a computer receiving a first message from a client device, the first message requesting at least one manipulation of a cost item associated with a first capital asset included in a project, the first message further requesting determination of a revenue impact of the at least one manipulation of the cost item. The method also comprises the computer accessing a project forecast database and identifying an at least one revenue item associated with the cost item, the revenue item comprising a first forecasted revenue associated with the first capital asset and comprising a second forecasted revenue associated with a second capital asset included in the project. The method also comprises the computer accessing a workflow allocations database to determine the approved development expense for the project, the approved development expense for the project comprising the approved development expense for the first capital asset and the approved development expense for the second capital asset, wherein the approved development expense for the first capital asset includes the cost item. The method also comprises the computer accessing a development expense database to determine the previously incurred development expense for the project, the previously incurred development expense for the project comprising the previously incurred development expense for the first capital asset and the previously incurred development expense for the second capital asset. The method also comprises the computer analyzing the previously incurred development expense for the first capital asset and remaining approved development expense for the first capital asset in relation to the first forecasted revenue. The method also comprises the computer analyzing the previously incurred development expense for the second capital asset and remaining approved development expense for the second capital asset in relation to the second forecasted revenue. The method also comprises the computer determining that a manipulation of the cost item comprising elimination of the cost item and reallocation of approved funds associated with the cost item from the first capital asset to the second capital asset favorably impacts the second forecasted revenue more than the manipulation unfavorably impacts the first forecasted revenue, the manipulation resulting in a net favorable impact on the revenue item. The method also comprises the computer sending a second message to the client device, the message containing the revenue impact of the manipulation of the cost item.

In an embodiment, a processor-implemented method of project engineering workflow and tracking is provided. The method comprises a computer receiving a first message from a client device, the first message requesting at least one manipulation of a cost item associated with a capital asset included in a project, the first message further requesting determination of a total financial impact of the at least one manipulation of the cost item associated with a first subscriber base and a second subscriber base, wherein the capital asset is scheduled to be used by the first subscriber base. The method also comprises the computer accessing a project forecast database and identifying an at least one revenue item associated with the cost item, the at least one revenue item comprising a first forecasted revenue associated with the capital asset projected to be generated by the first subscriber base. The method also comprises the workflow accessing a workflow allocations database to determine the approved development expense for the project, the approved development expense for the project comprising approved but not incurred development expense for the capital asset, wherein the approved development expense for the capital asset includes the cost item. The method also comprises the computer accessing an incurred expense database to determine the previously incurred development expense for the project, the previously incurred development expense for the project comprising the previously incurred development expense for the capital asset. The method also comprises the computer determining that a manipulation of the cost item comprising elimination of the cost item causes removal of the capital asset from the project and results in a first revenue impact, the first revenue impact comprising the loss of the first forecasted revenue arising from projected subscription income from the first subscriber base associated with the capital asset. The method also comprises the computer determining a second revenue impact of the elimination of the cost item, the second revenue impact comprising the loss of subscriber revenue from the second subscriber base arising from the first subscriber base placing additional load on the service infrastructure previously used primarily by the second subscriber base. The method also comprises the computer determining a first cost impact of the elimination of the cost item, the first cost impact comprising the write-off of the previously incurred development expense for the capital asset. The method also comprises the computer determining a second cost impact of the elimination of the cost item, the second cost impact arising from the projected increased burden on a customer service function arising from the elimination of the capital asset. The method also comprises the computer determining a third cost impact of the elimination of the cost item, the third cost impact associated with projected reduction in customer satisfaction arising from the elimination of the capital asset. The method also comprises the computer determining a fourth cost impact of the elimination of the cost item, the fourth cost impact associated with the release of budgeted but unspent resources remaining in the approved development expense database for the capital asset. The method also comprises the computer combining the first revenue impact, the second revenue impact, the first cost impact, the second cost impact, the third cost impact, and the fourth cost impact to determine the total financial impact of the manipulation of the cost item comprising elimination of the cost item. The method also comprises the computer sending a second message to the client device, the second message communicating the total financial impact of the manipulation of the cost item.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3*b* is a flow chart illustrating another method according to an embodiment of the disclosure.

DETAILED DESCRIPTION

Figure 1:
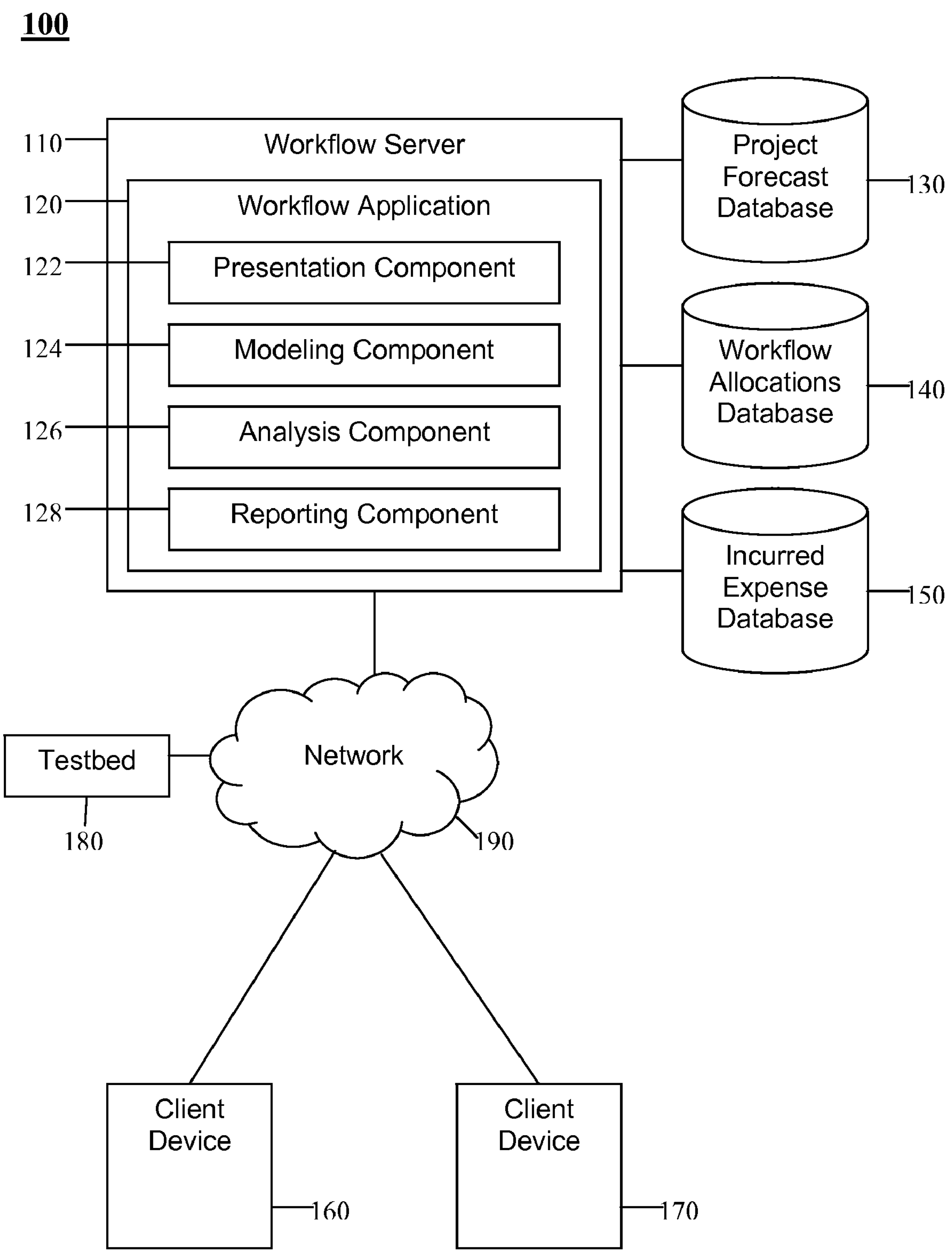
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a project engineering workflow and tracking system that promotes the combination of information from databases containing forecasted costs and revenues associated with projects, from databases describing workflow allocations wherein development expenses for projects have been specifically budgeted, have received approval but have not yet been incurred, and from databases describing sunk or incurred costs associated with projects. Selected items of information from these databases can be placed into testbeds created for the purpose of modeling and simulating project and component capital asset investment scenarios. Revenue streams projected for projects at various stages of completion may be placed in the same testbed as a group of costs, both costs approved for spending and costs already spent. The present disclosure teaches a modeling and analysis method that allocates costs with projected revenues that may increase revenues. The project engineering workflow and tracking system may provide a strategic look forward that allows a more informed examination of the strategic value of a capital investment.

In an embodiment, the project engineering workflow and tracking system provides for the examination and manipulation of cost, revenue, and other data associated with capital investment projects in a sandbox environment or testbed environment. A sandbox environment and/or testbed environment may comprise an isolated data set or portion of a database that can be manipulated and analyzed using the project engineering workflow and tracking system to understand different operational scenarios based on different assumptions and without affecting the work of others using the system. Embodiments permit the extraction of cost data from various cost databases and the extraction of revenue data from project and other databases and placement of the data in a testbed wherein costs and revenues may be associated with different projects and individual capital items within projects. The amounts and allocations of costs to projects and the alignment of costs to revenues through project associations may be experimented with and manipulated to determine various rates of return and levels of profitability of projects. Costs may be manipulated in ways that may permit a more efficient allocation of resources for an organization deploying capital assets.

Components of the project engineering workflow and tracking system described herein may interact with elements of associated project workflow management tools that track project activity including planning documents, engineering materials, inventory procurement records, and project authorization documents. The present disclosure teaches the restriction of access to data to levels of management with responsibility for and authority over projects. As perspective moves up from one level to the next level of management, information about projects is consolidated and rolled up for examination by authorized managers and executives. Because the project engineering workflow and tracking system promotes simulation, modeling, and testing systems and methods, a plurality of testbed implementations can be created and receive input simultaneously and combined in a variety of manners. Decisions resulting from testbed simulations may eventually receive executive action with resulting cost decisions applied in the organization's production environment.

Turning now to FIG. 1, a project engineering and workflow tracking integration system 100 is provided. The system 100 comprises a workflow server 110, a workflow application 120, a project forecast database 130, a workflow allocations database 140, an incurred expense database 150, client devices 160, 170, a testbed 180, and a network 190.

The workflow server 110 may be a computer system. Computer systems are discussed in greater detail hereinafter. The workflow server 110 may comprise one computer or a plurality of computers, for example, a server farm wherein many server computers cooperate to share a processing load. The workflow server 110 may comprise a plurality of computers that are located at different places, for example, to provide geographical diversity and increased service reliability. The workflow server 110 may be implemented as one or more virtual servers in a cloud computing environment. Cloud computing is discussed further hereinafter. The workflow server 110 executes one or more applications including the workflow application 120.

The workflow application 120 executes on the workflow server 110 and analyzes information from a plurality of databases including the project forecast database 130 about forecasted revenues associated with capital investment projects. The workflow application 120 also analyzes information from the project forecast database 130 and additional databases about development and acquisition costs associated with capital investment projects, including costs already incurred and costs approved for spending but not yet incurred. The workflow application 120 receives requests from client devices 160, 170 to simulate capital investment projects in sandbox environments or testbeds 180 segregated from actual financial accounts and production data activity. Costs, including costs already incurred and paid, costs approved but not yet paid, and costs estimated or projected but not yet approved, may be requested from the workflow application 120 and presented to the client device 160. The workflow application 120 allows the client device 160 to manipulate the costs in a variety of manners, including increasing, reducing, eliminating, changing the timing of, and reallocating costs to different areas of a capital investment project or to different projects entirely.

The workflow application 120 may link forecasted and actual revenue streams produced by a project with costs charged or chargeable to the project. The present disclosure teaches enabling the client device 160 to use a testbed 180 to experiment with changing cost amounts within projects and reallocating costs within and across projects to align more efficiently and profitably with forecasted revenue streams associated with the projects. The workflow application 120 may allow modeling of different financial and project scenarios requested by the client device 160 to align both incurred or sunk costs as well as projected costs with forecasted revenue streams to support more efficient use of resources and achieve better rates of return on capital investment projects. The workflow application 120 analyzes forecasted revenue streams and may apply probabilities and discount rates to the revenue streams based on business, financial, and other risk factors. The workflow application 120 may permit the client device 160 to manipulate probabilities and risk factors to experiment with achieving profitability and rates of return that will ultimately support investment and other decisions made regarding capital projects.

The present disclosure also teaches the workflow application 120 combining testbed scenarios created for a plurality of client devices 160, 170 to establish a master or consolidated testbed 180 that may be analyzed by senior managers and considered for approval. Project managers could independently work on separate aspects of a master or larger project in individual testbeds 180 assigned to each project manager. Each testbed 180 could be manipulated and tested to the satisfaction of the assigned project manager. Cost, revenue, and other variables associated with each project manager's individual portion of the overall project may be eligible for manipulation only by the project manager. Access to individual testbeds 180 may be restricted, and testbeds 180 may not be coupled while component variables are subject to manipulation. An individual project manager may also be able to manipulate some environmental variables in his or her individual testbed 180, such as economic and business conditions.

Because the testbed 180 is a simulated environment, the project manager may be able to manipulate and test a variety of cost and revenue scenarios under a range or business and operating conditions. A group of project managers working collaboratively on a larger project may, after finalizing their work for their simulated environments in their individual testbeds 180, consolidate the work in their testbeds 180 into a master testbed 180 for the overall project. The master testbed 180 may be a representation of an entire project involving component project element items tested in the individual testbeds 180 under the responsibility of the individual project managers. A senior project manager or executive may use the master testbed 180 for overall project analysis and approval. When complete, the senior project manager or executive may submit specifically approved amounts from the master testbed 180 for actual expenditure and integration into the live financial accounts of the organization. The workflow application 120 teaches consolidation of testbed environments and associated spending approvals as projects are escalated up through a management structure from supervisor to manager to director and ultimately to executive level, if necessary, for final approval.

The workflow application 120 also manages the visibility and accessibility of information about projects and associated costs and revenues as the information is moved from one level of management to another. The workflow application 120 determines the information in the various databases and in testbeds 180 associated with project activities that are made available for viewing and manipulation by managers. The workflow application 120 makes these determinations as project information is both submitted up a management structure for approval as well as disseminated back down the structure for implementation or further manipulation. In an embodiment, information about costs, revenues, and profitability of capital investment projects may be confidential and should not be immediately visible to everyone in an organization. Some projects may be only in a proposal or discussion stage and may involve trade secrets, product development information, and/or organizational strategy. Some projects may involve, for example, the potential for organizational restructuring that may result in the elimination of jobs, the shuttering of facilities, and the sale, relocation, or closing of divisions.

The approval of expenses related to work activities and development areas of projects may be a sensitive area, and an organization may wish to limit the access to this information. A supervisor or manager without authority over a project may not be able to view cost information about a project, particularly information about the costs for project-related work that has been approved. Accessibility to supporting documents may also be limited. Executives, directors, and senior managers will be able to view information about projects directly associated with subordinate managers reporting to them. Project information is in effect consolidated and "rolled up" from one management level to the next so that as project information moves up the management structure, a senior manager may be able to view consolidated as well as broken out project information for all of the subordinate managers in the reporting structure under the senior manager. As consolidated information about a project is distributed back down a management structure and may become more widely visible, privileged information not meant for general viewing may be removed wherein only managers with a "need to know" are able to view the privileged information.

The workflow application 120 comprises the presentation component 122 that receives a request from a client device 160 to access information about costs, revenues, and other elements of capital investment projects. The presentation component 122 may extract the information from the project forecast database 130 that may contain listings of actual and projected costs and revenues and other financial data associated with different projects. The presentation component 122 generates the list of costs of interest to the client device 160 and presents the costs in a sandbox or testbed 180 created for the client device 160.

The testbed 180 is a software simulation of a project or projects associated with costs selected for analysis by the client device 160. The testbed 180 is test environment that is isolated and shielded from the dangers and complications associated with testing in a live or production environment. A client device 160 uses a testbed 180 to mimic as closely as possible the production environment. The cost, revenue, and other components in a properly constructed testbed 180 should behave as if already part of the production environment. Testbeds 180 replicate at least the minimal functionality needed to accurately test the project scenario under consideration. The testbed 180 is created by the workflow application 120. While FIG. 1 depicts the testbed 180 as associated with the network 190, in an embodiment, the testbed 180 may be created and reside on the client device 160, 170, on the workflow server 110, on a combination of these components, or elsewhere in the system 100. In addition to presenting the project costs specifically requested by the client device 160, the presentation component 122 may also present in the testbed 180 other costs not specifically requested but relevant to the requested costs and revenues and their analysis. The presentation component 122 may also present other non-cost financial accounts and data relevant to the analysis.

In addition to cost information, the presentation component 122 also draws revenue information from the project forecast database 130 related to capital investment projects and places the revenue information into the testbed 180 created for the client device 160. In an embodiment, individual revenue streams and cost items, whether occurring once or on a recurring basis, may not align directly on projects or directly with each other. Some revenue streams may be attributable to several projects or component capital investments. Some costs may be spread across a plurality of projects and component investments. Further complexity may arise from the intention of the client device 160 to analyze costs, revenues, and other financial items on at least one of a cash basis, a cost accounting basis, a financial accounting basis, and a tax basis. In an embodiment, the present disclosure may provide for the workflow application 120 to present financial and other information and prepare analyses on any of these bases. Costs and revenues expressed in different currencies may cause additional complication. The presentation component 122 may also draw revenue information from sources other than the project forecast database 130. In an embodiment, some revenue items or streams may not be formally associated with a project or capital investment item in the accounting or other records of an entity and the information about the revenue may be drawn by the presentation component 122 from an alternate source.

In addition to extracting project cost information from the project forecast database 130, the presentation component 122 may also extract cost information from the workflow allocations database 140 and the incurred expense database 150 and provide the information to the client device 160 in the testbed 180. The workflow allocations database 140 contains information about costs related to capital asset investments, labor, and other development expenses that have received the necessary management approval but have not yet been incurred. The expenses have been budgeted and approved but the work has not been performed or the goods have not been purchased, and the funds allocated for the expenses have therefore not yet been disbursed.

The incurred expense database 150 contains the same type of information about costs related to projects and component capital investment items as the workflow allocations database 140, except that the costs in the incurred expense database 150 have already been committed and legally incurred to a vendor or other party, and either paid or still pending payment. This may be referred to as "actuals" data. In an embodiment, approved but unpaid costs in the workflow allocations database 140 and incurred and paid or payment pending costs in the incurred expense database 150, may be chargeable or charged to a single project or component capital investment within a project or may be spread across more than one project or investment. In an embodiment, the workflow allocations database 140, containing only approved and not incurred development and acquisition expenses, may contain some approved expense items that have not yet been specifically associated with a project.

Since the present disclosure teaches the manipulation of costs in the setting of a testbed 180 and the consolidation and rolling up of cost information, a client device 160 may experimentally make adjustments to costs in the testbed 180 in any way deemed appropriate for the purposes of the client device 160. In an embodiment, the project forecast database 130, that may be the primary source of information about cost items and revenue streams associated with projects, may contain information that is duplicated by information in the workflow allocations database 140 or the incurred expense database 150. While FIG. 1 depicts the project forecast database 130, the workflow allocations database 140, and the incurred expense database 150 coupled to the workflow server 110, in an embodiment the project forecast database 130, the workflow allocations database 140, and the incurred expense database 150 may be collectively or separately coupled to other components of the system 100.

The presentation component 122 may create the testbed 180 per the request of the client device 160, extracts the cost, revenue, and other information requested by the client device 160 from the project forecast database 130, extracts cost information from the workflow allocations database 140 and the incurred expense database 150, and stages the cost information in the testbed 180 for manipulation by the client device 160. The presentation component 122 stages the cost information in a structure in the testbed 180 and adds in supplemental or supporting files or account information that enables the client device 160 to derive meaningful results from its manipulation of cost and other information.

The workflow application 120 also comprises the modeling component 124 that enables the client device 160 to create scenarios or models within the testbed 180 that test different combinations of costs and revenues for an existing or contemplated project or component capital investment. In an embodiment, a client device 160 could construct three separate models of a single project in the testbed 180. Each model may contain a different combination of actual or projected costs and revenues, with the differences between each model attributable, for example, to different economic or business conditions that may impact the project. The modeling component 124 enables the client device 160 to manipulate cost and revenue variables across the separate models and observe the effect that a manipulation of a particular variable might have on other variables in the models and particularly on resulting calculations of each model, for example, projected rate of return and projected profitability of the project.

Accounting conventions, tax regulations, and accepted financial analysis practices may permit flexibility with how costs may be allocated to projects and component investment items within projects. The same may be true for the association of revenue items and streams of revenues with projects and component investments. The present disclosure teaches the examination of databases that associate costs with projects and the examination of other databases that associate revenues with projects. While in some embodiments, databases containing project and capital investment information may contain both costs and revenues directly and clearly aligned with the same project or even the same unit of capital investment, such as a machine, vehicle, or aircraft, in practice the attribution of costs and revenues to the projects and capital investment components may be a more subjective matter. In some cases, costs and revenues may not be directly linked and the association of costs with revenues may be a matter of professional judgment by an accountant, analyst, or manager. The present disclosure teaches the association of project cost information with revenue streams that may be attributable to projects and the allocation of costs to revenues in projects that permits the achievement of acceptable or better rates of return within accepted conventions and practices. The modeling component 124 is a tool within the workflow application 120 that enables the client device 160 to insert, remove, and reallocate cost items within the testbed 180 and associate the costs with revenues to analyze project and component investment scenarios.

The workflow application 120 also comprises the analysis component 126 that provides quantitative and analytical support to the client device 160 in making decisions about aligning costs and revenues associated with projects. While the modeling component 124 may assist the client device 160 in building project scenarios based on cost and revenue information and in incorporating assumptions into the scenarios, the analysis component 126 may apply intelligence to the modeling by detecting and identifying risks, opportunities, and other points of note that the client device 160 might neither see by examining the scenario being modeled nor have immediate access to the necessary information to detect or fully grasp the implications of the scenario. The analysis component 126 may alert the client device 160 to a subtle aspect of a decision that might not be immediately visible or apparent. A project decision may have different aspects or outcomes when examined on a cash flow basis, an accounting basis, and a tax basis. A manager or analyst examining a project may not have expertise in each of these areas.

The analysis component 126 may point out areas that bear further examination and points of analysis that may be of particular importance or pivotal in the making of a decision. If a client device 160, in using the presentation component 122 and modeling component 124 to construct a scenario, builds one or more assumptions into the scenario that have an elevated risk or include factors that are subject to sudden or unpredictable change, the analysis component 126 may alert the client device 160. If the workflow application 120 builds a scenario for a client device 160 in which a minor modification of one or more factors may have a disproportionate effect on the profitability, return on investment, or other result of the scenario, the analysis component 126 may detect these factors and specifically identify them for the client device 160.

The workflow application 120 also comprises the reporting component 128 that determines the information in the project forecast database 130, the workflow allocations database 140, the incurred expense database 150, and other files and folders associated with project activities that is made available for viewing and manipulation in the testbed 180. The reporting component 128 determines the project-related information in the databases that may be viewable at various levels of management. The reporting component 128 makes this information viewable to managers that have authority over projects and their superiors. The reporting component 128 may limit the visibility of sensitive or privileged information to those managers and executives with a need to know about the information.

While the present disclosure may teach embodiments that may be primarily financial in nature, the components of the system 100 may interact with components of one or more other systems related to project matters. The other systems may track and manage workflow aspects of projects that are not primarily financial, for example project lifecycle, planning documentation, work status tracking, materials ordering and tracking, work approvals, and installation records. In an embodiment, some information used by components of the system 100 may be originated by those workflow areas and the system 100 may at times generate information that is provided to those areas. The approval of work tasks, which may be supported by entries in the workflow allocations database 140, may involve a flow of supporting documents, such as project authorizations, project identifiers, tracking identifiers, and network planning letters in the case of a telecommunications service provider.

The network 190 promotes communication between the components of the system 100. The network 190 may be any communication network including a public data network (PDN), a public switched telephone network (PSTN), a private network, and/or a combination thereof.

The present disclosure teaches the comparison and analysis of projects wherein a client device 160 may examine the profitability, completion schedules, customer bases, and cost and revenue assumptions associated with projects. In an embodiment, a client device 160 may be considering a decision whether to reallocate funds associated with an approved cost item for one project to an approved cost item associated with another project that will ultimately be a more profitable use of the funds at the time given the completion stages of the two projects. Components of the workflow application 120 take into account the timing of cash flows and apply discount rates to risk factors and future cash flows as is accepted practice with capital budgeting analysis.

In an example, projects and customer bases for two separate capital investments may be determined to be of equivalent profitability. The first project in the example is already operational and generating revenue and the second project is not complete, but needs only one remaining approved cost item to be expended for the second project to then become operational. A client device 160 may examine the two projects in the testbed 180 and consider the funds designated for the remaining approved cost item presently targeted for expenditure on the second project. The client device 160 may wish to test a hypothesis that immediately reallocating those funds for a productive use associated with the first project might increase the long term profitability of the first project by a margin sufficient to justify delaying the second project until new funding can be approved for the remaining cost item for the second project. Since the first project is already operational, expending funds to improve online purchasing by customers, for example, may have an immediately positive impact on the profitability of the first project that justifies the diverting of the funds from the second project to the first project. The present disclosure teaches the use of the components of the workflow application 120 and the testbed 180 to test a variety of hypotheses about allocations of costs and expenses to align more profitably with revenue streams.

Figure 2A:
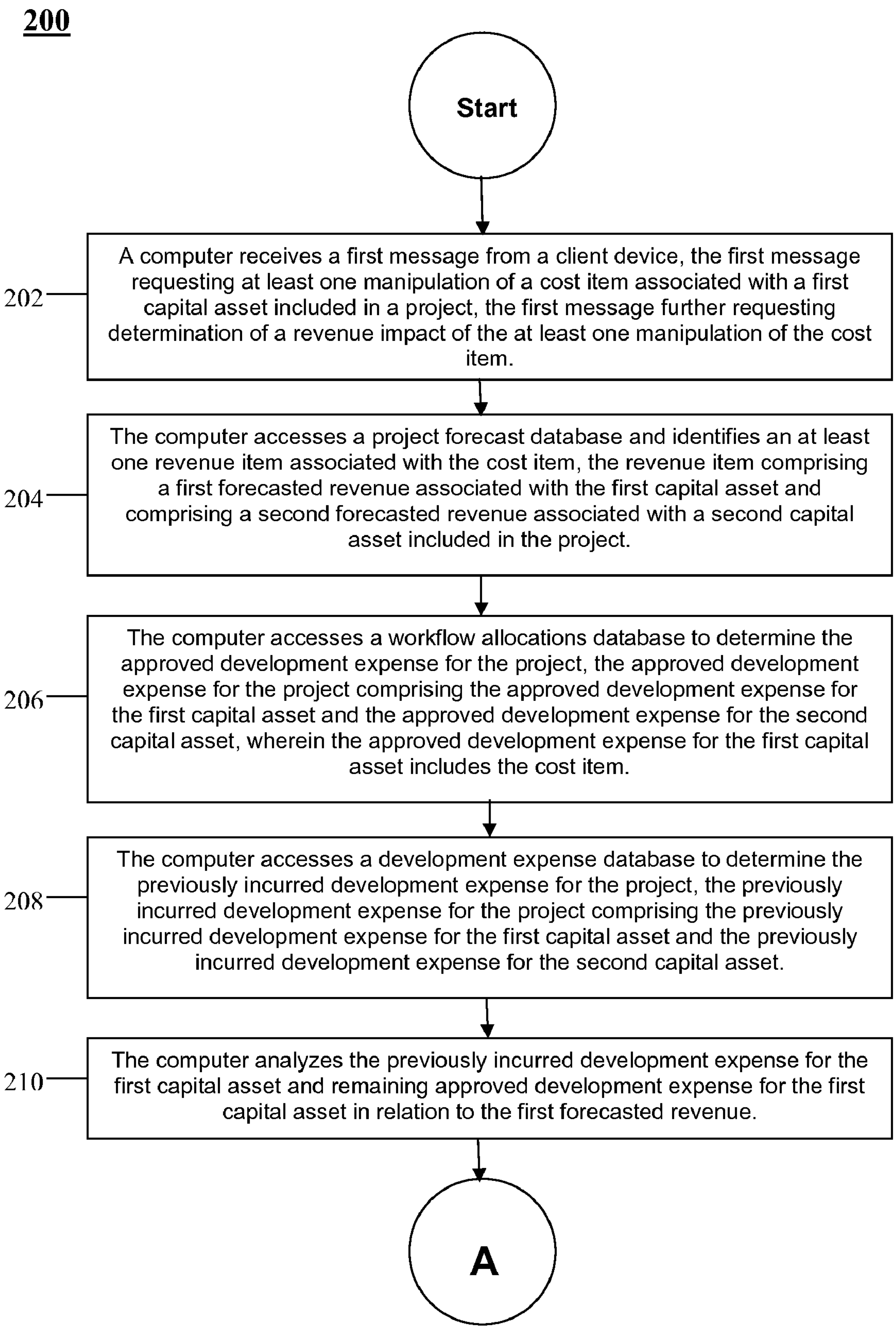
FIG. 2*a* is a flow chart illustrating a method according to an embodiment of the disclosure.
Figure 2B:
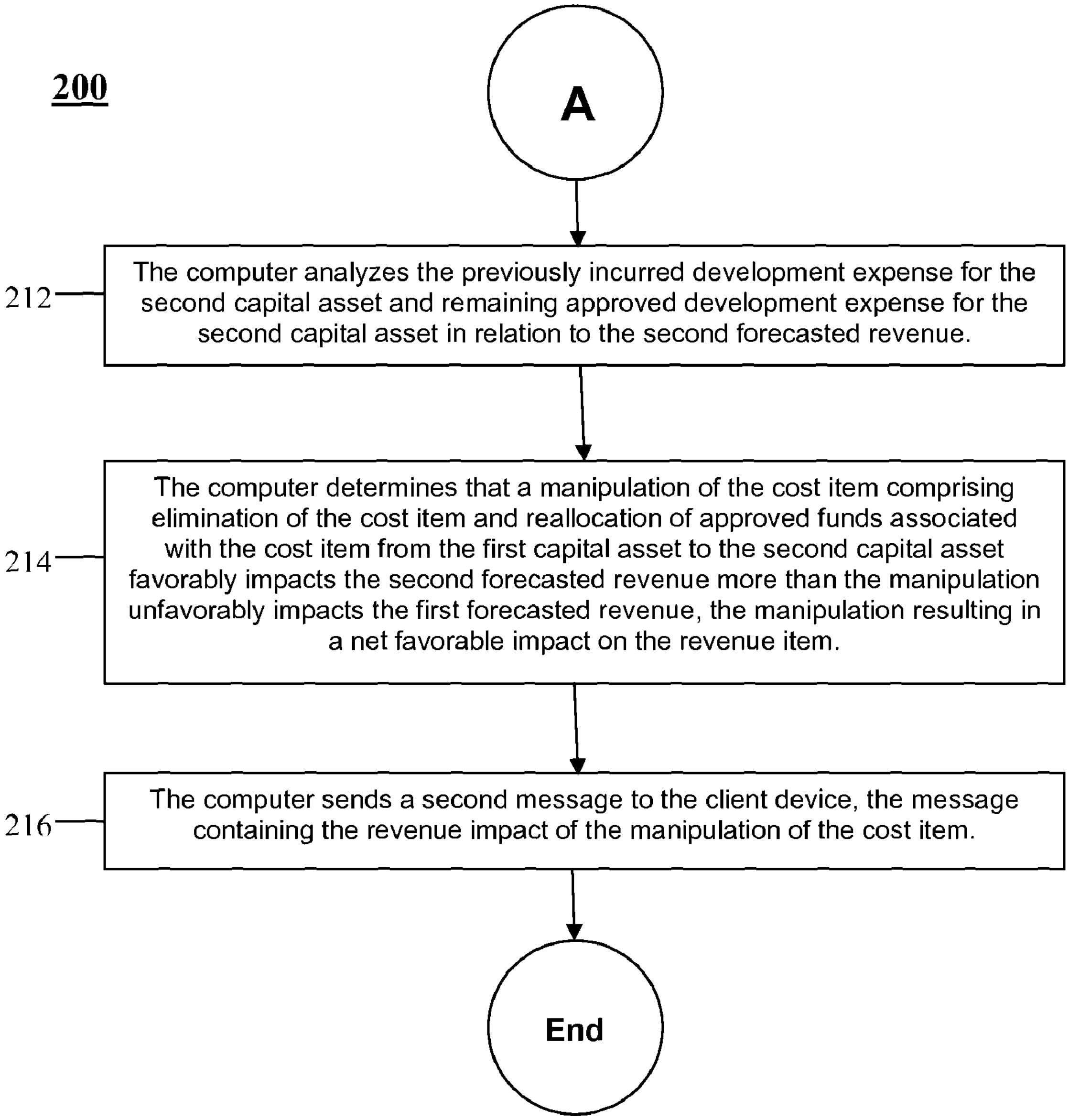
FIG. 2*b* is a flow chart illustrating a method according to an embodiment of the disclosure.

Turning now to FIG. 2, a method 200 of project engineering and workflow tracking integration is provided. Beginning at block 202, a computer, in an embodiment the workflow server 110, receives a first message from a client device 160, the first message requesting a manipulation or change to a cost item associated with a first capital asset included in a project and the revenue impact of the change to the cost item. The first capital asset may be a telephone exchange switching device to be placed into production by a communications services provider. In an embodiment, the revenue impact of the change to the cost item may affect not just the revenue of the first capital asset but also the revenue associated with other capital assets.

At block 204, the workflow server 110 accesses the project forecast database 130 identifying at least one revenue item associated with the first capital asset and the cost item. In the method 200, the revenue item comprises a first forecasted revenue associated with the first capital asset but also comprises a second forecasted revenue associated with a second capital asset that is part of the project but not related to the cost item or the first capital asset. Revenue streams may not be divisible and directly attributable to individual capital assets. It may not be possible to precisely segment the revenue item by revenue associated with the first capital asset and revenue associated with the second capital asset. At block 204, the presentation component 122 may create the testbed 180 and enter in the relevant cost and revenue items needed to perform the analysis and other steps of the method 200.

At block 206, the workflow server 110 accesses the workflow allocations database 140 to examine the approved development expense for the first capital asset and the approved development expense for the second capital asset. The approved development expense for the first capital asset includes the first cost item. At block 208, the workflow server 110 accesses the incurred expense database 150 to examine the already incurred development expenses for the project which includes development expenses for both the first capital asset and the second capital asset. The actions at blocks 206 and 208 determine, respectively, the development expenses that have been approved but not incurred for the two capital assets and the development expenses that have been incurred and either paid or are pending payment for the two capital assets.

At block 210, the workflow server 110 analyzes the previously incurred development expense and the remaining approved development expense for the first capital asset in relation to the first forecasted revenue for the first capital asset. The modeling component 124 may be determining how much funding and other resources have already been sunk into the project for the first capital asset, how much approved funding remains for the first capital asset, and when and how much revenue can be expected from the deployment of the first capital asset.

At block 212, the workflow server 110 conducts the same exercise for the second capital asset that it did for the first capital asset at block 210. At both blocks 210 and 212, the workflow server 110 is seeking information to compare what has already been spent, how much remains to be spent, and the revenue that can be expected when the spending is complete and the asset in question is brought on line and begins producing revenue. The workflow server 110 is comparing the economics of the two capital assets. As noted, it may not be possible to attribute revenue streams directly to individual capital assets. The actions at blocks 210 and 212 may involve the analysis component 126 providing input about the attribution of revenue in the revenue item to the respective capital assets. The modeling component 124 and the analysis component 126 may create several scenarios within the testbed 180 comprising different instances of the first and second forecasted revenues because, as noted, the revenue item determined to align with the cost item may not be readily divisible into individual component revenue streams attributable directly to the first capital asset and the second capital asset. In an embodiment, the components of the workflow application 120 may determine that the second capital asset has an economic rate of return higher than that of the first capital asset and that it may be advantageous to determine ways to bring the second capital asset into production sooner and/or determine ways to increase the capacity of the second capital asset.

At block 214, the workflow server 110 determines that an outright elimination of the cost item and reallocation of the funds associated with the cost item from the first capital asset to the second capital asset would have a positive impact on the second forecasted revenue associated with the second capital asset greater than the unfavorable impact on the first forecasted revenue associated with the first capital asset arising from the elimination of the cost item. In an embodiment, the cost item that had previously been approved for the first capital asset may have been for training of personnel associated with the first capital asset, for a software or hardware maintenance contract on the first capital asset to be paid in advance, or for some type of insurance associated with the first capital asset, for example. It may be determined that the approved funds for those types of expenses may have a more favorable revenue impact on the entire project, which includes both capital assets, if the funds are redirected from the previously intended use for the first capital asset to a use associated with the second capital asset. The funds may possibly be used to bring the second capital asset into production sooner, to install a higher capacity component that would enable the second capital asset to manufacture goods at a greater speed, or to purchase newly-released software that allows the second capital asset to serve customers more rapidly, thus producing more revenue. In an embodiment, the information about the application of the funds originally designated for the first capital asset determined at block 214 to be more profitably applied to the second capital asset may not have been available when the projects were originally approved. In an embodiment, cost and revenue assumptions about either or both of the capital assets may have changed over time. In an embodiment, external factors, such as tax laws and accounting conventions may have changed that caused the overall economic proposition of the two capital assets to change.

At block 216, the workflow server 110 sends a second message to the client device 160 and advises the client device 160 of the determination made at block 214. The workflow server 110 advises the client device 160 that the components of the workflow application 120 had determined that it made economic sense to eliminate the cost item previously designated for the first capital asset and reallocate the funds previously designated for the cost item to the second capital asset.

Figure 3A:
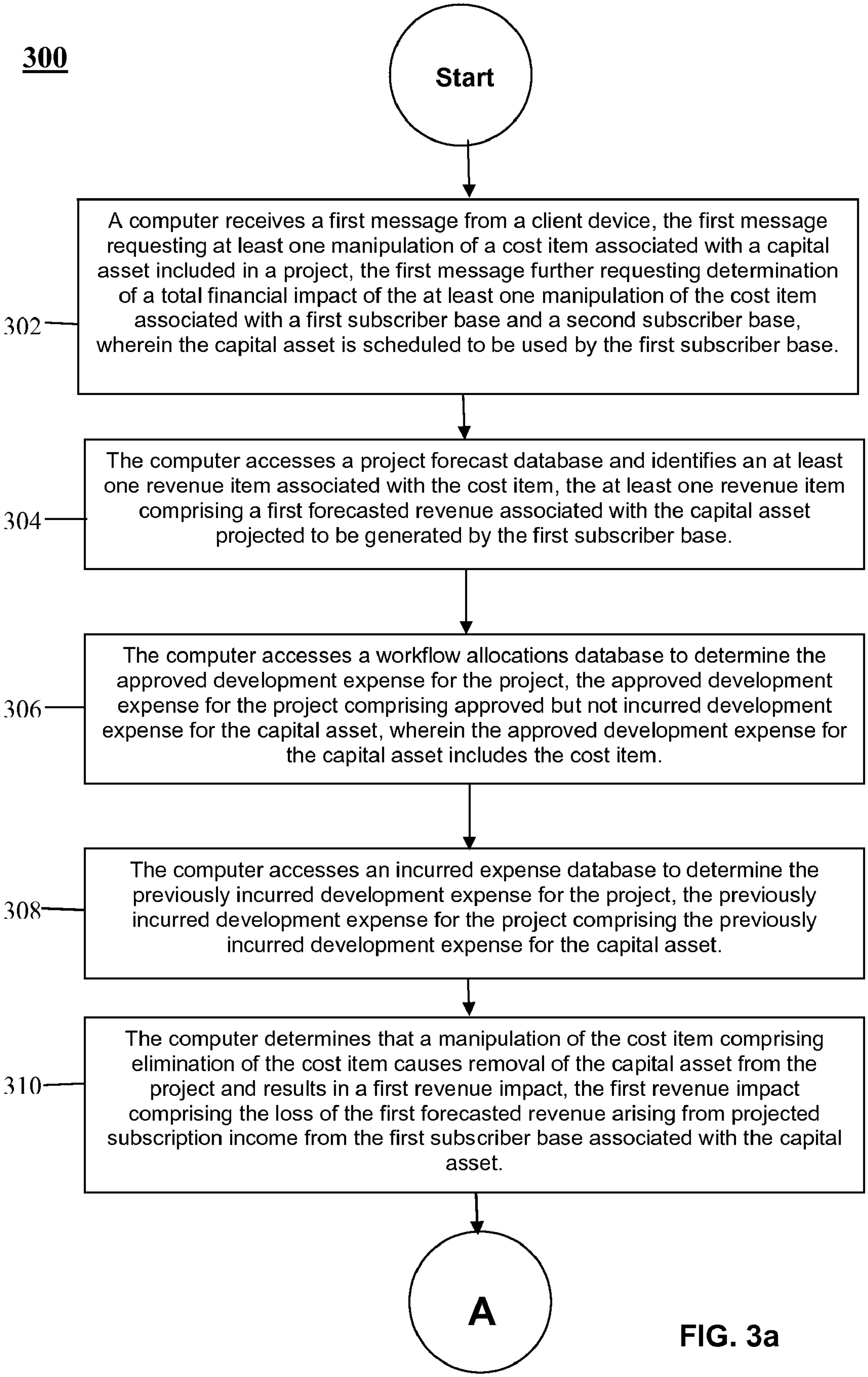
FIG. 3*a* is a flow chart illustrating another method according to an embodiment of the disclosure.

Turning now to FIG. 3, a method 300 of project engineering and workflow tracking integration is provided. Beginning at block 302, a computer, in an embodiment the workflow server 110, receives a first message from a client device 160, the first message requesting a change or manipulation of a cost item associated with a capital asset included in a project. The first message also requests the workflow server 110 to determine the total financial impact of the manipulation of the cost item. The financial impact of the manipulation of the cost item comprises increases and decreases in costs and revenue resulting from the manipulation. The financial impact of the manipulation of the cost item also comprises changes in the timing of costs and revenue, for example, an acceleration or delay of costs and revenue resulting from the manipulation. The changes to costs and revenues may be direct effects of the manipulation or they may be changes that arise from secondary or collateral effects of the manipulation. While one subscriber base may be directly affected by a change, the actions of the subscriber base may have secondary effects on another subscriber base wherein the other subscriber base is not directly involved with the cost item being manipulated. While a cost item may only directly affect a capital asset or project used by one customer, actions impacting that cost item may result in behavior by the customer that secondarily affects one or more other customers who were not using the capital asset.

At block 304, the workflow server 110 accesses the project forecast database 130 and identifies at least one revenue item associated with the cost item, the at least one revenue item comprising a first forecasted revenue projected to arise from the operation of the capital asset used by customers in the first subscriber base. The presentation component 122 may enter this information in the testbed 180 created for the client device 160.

At block 306, the workflow server 110 accesses the workflow allocations database 140 to determine that the cost item is approved. At block 308, the workflow server 110 accesses the incurred expense database 150 to determine the total of other development expenses associated with the capital asset that have already been committed and incurred. For example, the workflow server 110 may access the incurred expense database 150 to determine the previously incurred development expense for the project, the previously incurred development expense for the project comprising the previously incurred development expense for the capital asset.

At block 310, the workflow server 110, working with the variables in the testbed 180 and perhaps performing a plurality of manipulations of the cost item, may investigate the alternative of eliminating the cost item entirely. In the method 300, the cost item is associated with the acquisition cost of the capital asset and hence elimination of the cost item would mean elimination of the capital asset and cancellation of its acquisition. At block 310, the workflow server 110 begins to determine the total financial impact of eliminating the cost item. The workflow server 110 determines a first revenue impact arising from the loss of revenue that would have been received from customers in the first subscriber base that was scheduled to use the capital asset.

At block 312, the workflow server 110 determines a second revenue impact of eliminating the cost item. The second revenue impact arises from the loss of subscriber revenue from the second subscriber base caused by customers in the first subscriber base placing additional load on the service infrastructure used primarily by the second subscriber base. The planned investment in the capital asset at some point was determined to be necessary because the first subscriber base was generating increasing demand or expected to generate increasing demand. Canceling the capital asset does not eliminate the current or expected demand by the first subscriber base. The processing burden of that demand must go somewhere and it may be borne by the service infrastructure used by the second subscriber base. This migration of processing burden may have a crowding effect on the second subscriber base and may result in a loss of some customers and associated revenue from the second subscriber base. This loss of revenue is the second revenue impact caused by the elimination of the cost item.

At block 314, the workflow server 110 determines a first cost impact of the elimination of the cost item, the first cost impact arising from the write-off of the previously incurred development costs associated with the capital asset. The elimination of the capital asset means that all sunk or previously incurred costs associated with the capital asset are subject to write off unless they can be applied elsewhere.

At block 316, the workflow server 110 calculates a second cost impact of the elimination of the cost item, the second cost impact arising from the projected increased burden on a customer service function caused by the elimination of the capital asset. As with the second revenue impact, the customers in the first subscriber base may place additional load on other areas of a service infrastructure. Because of the potential crowding effect previously described, customers in some or all subscriber bases may experience temporary or permanent service degradation that results in their placing additional workload on a customer service function. This additional workload creates the second cost impact.

At block 318, the workflow server 110 calculates a third cost impact of the elimination of the cost item, the third cost impact arising from the loss of customer satisfaction due to the aforementioned crowding effect. Loss of customer satisfaction may be associated with both the first subscriber base and the second subscriber base. Measuring loss of customer satisfaction in terms of actual monetary cost may be difficult and may only be done over an extended period, but it is a real cost that impacts profitability. Degradation of customer satisfaction, whether temporary or permanent, carries with it monetary costs in terms of potential loss of market share, for example.

At block 320, the workflow server 110 calculates a fourth cost impact of the elimination of the cost item arising from the release of budgeted but unspent resources from the workflow allocations database 140. Although amounts in this database are not actually spent, the unit within an organization that sponsored the approval of the investment in the capital asset did expend resources in getting the investment approved. Since the method 300 teaches elimination of the cost item that results in cancellation of the capital asset, costs associated with securing management and executive approval of development expenses associated with the capital asset, even development expenses not yet formally incurred, may need to be accounted for.

At block 322, the workflow server 110 adds the first revenue impact, the second revenue impact, the first cost impact, the second cost impact, the third cost impact, and the fourth cost impact to determine the total financial impact of the manipulation of the cost item comprising elimination of the cost item. The total financial impact may need to be considered in light of the savings realized by eliminating the cost item wherein the cost item in the method 300 is the purchase or other acquisition cost of the capital asset.

At block 324, the workflow server 110 sends a second message to the client device 160, the second message communicating the total financial impact of the manipulation of the cost item.

In an embodiment, in the method 300, an organization may be a wireless communication service provider, and the capital asset may be a new telephone switching device that the organization was intending for use by the first subscriber base while the second subscriber base was intended to continue using separate service infrastructure that it had been previously using. In an embodiment, the first subscriber base and the second subscriber base may be subject to different payment plans with the wireless communications service provider. The first subscriber base may pay a flat rate for unlimited usage of services, and the second subscriber base may pay per each use of services. In an embodiment, the business associated with the second subscriber base may be considered more profitable than the business associated with the first subscriber base. Eliminating the cost item, which in the method 300 causes the capital asset scheduled to be used by the first subscriber base to be eliminated, may result in the crowding effect described wherein the first subscriber base, with its expected increasing demand, places additional load on the existing service infrastructure previously used primarily, and perhaps exclusively, by the second subscriber base. Manipulating a cost item associated with one revenue stream generated by one subscriber base may cause secondary and collateral effects on the behavior of another subscriber base not directly associated with the cost item. Manipulating a cost item directly associated with only one specific revenue stream may, through customer behaviors, cause other revenue streams not directly related to the cost item to be affected.

Figure 4:
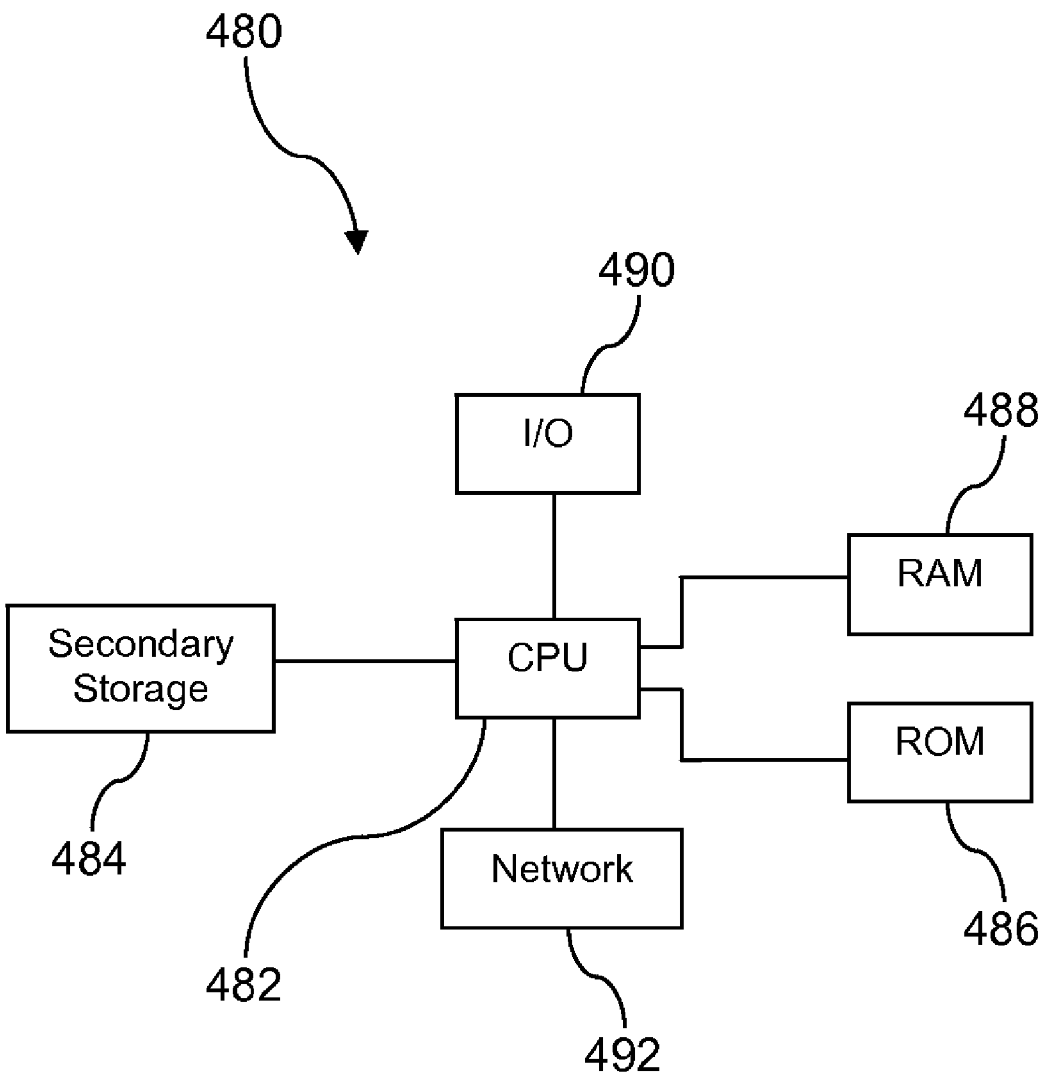
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example, in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of project engineering workflow and tracking, comprising:

a computer receiving a first message from a client device, the first message requesting at least one manipulation of a cost item associated with a capital asset included in a project, the first message further requesting determination of a total financial impact of the at least one manipulation of the cost item associated with a first subscriber base and a second subscriber base, wherein the capital asset is scheduled to be used by the first subscriber base;

the computer accessing a project forecast database and identifying an at least one revenue item associated with the cost item, the at least one revenue item comprising a first forecasted revenue associated with the capital asset projected to be generated by the first subscriber base;

the computer accessing a workflow allocations database to determine the approved development expense for the project, the approved development expense for the project comprising approved but not incurred development expense for the capital asset, wherein the approved development expense for the capital asset includes the cost item;

the computer accessing an incurred expense database to determine the previously incurred development expense for the project, the previously incurred development expense for the project comprising the previously incurred development expense for the capital asset;

the computer determining that a manipulation of the cost item comprising elimination of the cost item causes removal of the capital asset from the project and results in a first revenue impact, the first revenue impact comprising the loss of the first forecasted revenue arising from projected subscription income from the first subscriber base associated with the capital asset;

the computer determining a second revenue impact of the elimination of the cost item, the second revenue impact comprising the loss of subscriber revenue from the second subscriber base arising from the first subscriber base placing additional load on the service infrastructure previously used primarily by the second subscriber base;

the computer determining a first cost impact of the elimination of the cost item, the first cost impact comprising the write-off of the previously incurred development expense for the capital asset;

the computer determining a second cost impact of the elimination of the cost item, the second cost impact arising from the projected increased burden on a customer service function arising from the elimination of the capital asset;

the computer determining a third cost impact of the elimination of the cost item, the third cost impact associated with projected reduction in customer satisfaction arising from the elimination of the capital asset;

the computer determining a fourth cost impact of the elimination of the cost item, the fourth cost impact associated with the release of budgeted but unspent resources remaining in the approved development expense database for the capital asset;

the computer combining the first revenue impact, the second revenue impact, the first cost impact, the second cost impact, the third cost impact, and the fourth cost impact to determine the total financial impact of the manipulation of the cost item comprising elimination of the cost item; and the computer sending a second message to the client device, the second message communicating the total financial impact of the manipulation of the cost item.

2. The method of claim 1, wherein the first subscriber base and the second subscriber base are subject to different payment arrangements with a service provider.

3. The method of claim 2, wherein customers in the first subscriber base pay a flat rate for unlimited usage of services.

4. The method of claim 2, wherein customers in the second subscriber base pay per each use of services.

5. The method of claim 1, wherein the server determines the revenue impacts on the first subscriber base and the second subscriber base in a testbed.

* * * * *